United States Patent [19]
Mutchler

[11] 3,765,035
[45] Oct. 16, 1973

[54] DISPOSAL SYSTEM FOR HUMAN WASTE

[75] Inventor: Paul A. Mutchler, University City, Mo.

[73] Assignee: American Air Filter Company, Inc., Louisville, Ky.

[22] Filed: July 12, 1972

[21] Appl. No.: 271,106

[52] U.S. Cl............................ 4/131, 4/118, 110/9 R
[51] Int. Cl............................................. A47k 11/02
[58] Field of Search................. 4/131, 118; 110/9 E, 110/9 R

[56] References Cited
UNITED STATES PATENTS

| | | | |
|---|---|---|---|
| 3,098,144 | 7/1963 | Dale | 4/131 |
| 3,323,473 | 6/1967 | Frankel | 110/9 E |
| 3,436,765 | 4/1969 | Sundberg | 4/131 |
| 3,486,174 | 12/1969 | Nordstedt | 4/131 |
| 3,548,421 | 12/1970 | Valdespino | 4/131 |
| 3,624,843 | 12/1971 | Andrus | 4/131 |
| 3,683,425 | 8/1972 | Patterson | 4/131 |
| 3,699,040 | 10/1972 | Reid | 4/131 UX |
| 3,725,963 | 4/1973 | Speer | 4/131 |

Primary Examiner—Henry K. Artis
Attorney—Ralph B. Brick et al.

[57] ABSTRACT

A disposal system for human waste incorporating vacuum and heat emitting means to reduce human waste to sterile, bacteria free gases; and, harmless, odorless powders. The system is particularly useful in mobile facilities, such as boats, ships, and the like.

11 Claims, 3 Drawing Figures

Patented Oct. 16, 1973

Patented Oct. 16, 1973

DISPOSAL SYSTEM FOR HUMAN WASTE

BACKGROUND OF THE INVENTION

This invention relates to a disposal system for human waste. In one aspect, it relates to a disposal system for human waste utilizing in combination vacuum means and heat emitting means. In another aspect, the invention relates to a system for the disposal of human waste especially adapted for use in mobile facilities which are beyond the reach of normal sewage systems.

In the conventional method used in the disposal of human waste, wastes are deposited in receptacles wherein water is utilized to flush this waste material to a treating plant. Treating plants remove impurities from the carrier water, returning the purified water to lakes and streams. However, in many cases, raw sewage is emptied directly into lakes, streams, and other bodies of water thereby causing pollution of these waters. In addition to this pollution problem, it has been common for boats, ships, and the like to empty their waste directly into the water in which they float thereby adding to the aforementioned water pollution problem.

SUMMARY OF THE INVENTION

In the present invention, it is recognized that it is desirable to provide a human waste disposal system for use in mobile facilities. Furthermore, it is recognized that it is desirable to provide a human waste disposal system for use in boats, ships, and the like wherein the waste material is reduced to sterile and harmless gases and owders which may later be disposed of without causing additional water pollution problems.

The present invention advantageously provides a straightforward arrangement for a human waste disposal system which may be used in a stationary or mobile facilities. The present invention further provides for a human waste disposal system which provides for the reduction of waste material to sterile and harmless gases and powders which may be disposed of without causing additional water pollution problems.

Various other features of the present invention will become obvious to those skilled in the art upon reading the disclosure as disclosed hereinafter.

More particularly, the present invention provides a disposal system for human wastes comprising: at least one receptacle for collecting waste products; a first conduit means connecting the receptacle in flow-through communication with a rotatable housing means; the housing means defining a plenum therein including a heat emitting means and grinding means, the housing means being connected to rotating means; a second conduit means connecting said housing means in flow-through communication with a vacuum source; and, an afterburner in communication with the vacuum source whereby vapors from the plenum are subjected to elevated temperatures.

IT is to be understood that the description of the examples of the present invention given hereinafter are not by way of limitation and various modifications within the scope of the present invention will occur to those skilled in the art upon reading the disclosure set forth hereinafter.

Referring to the drawing.

Figure 1:
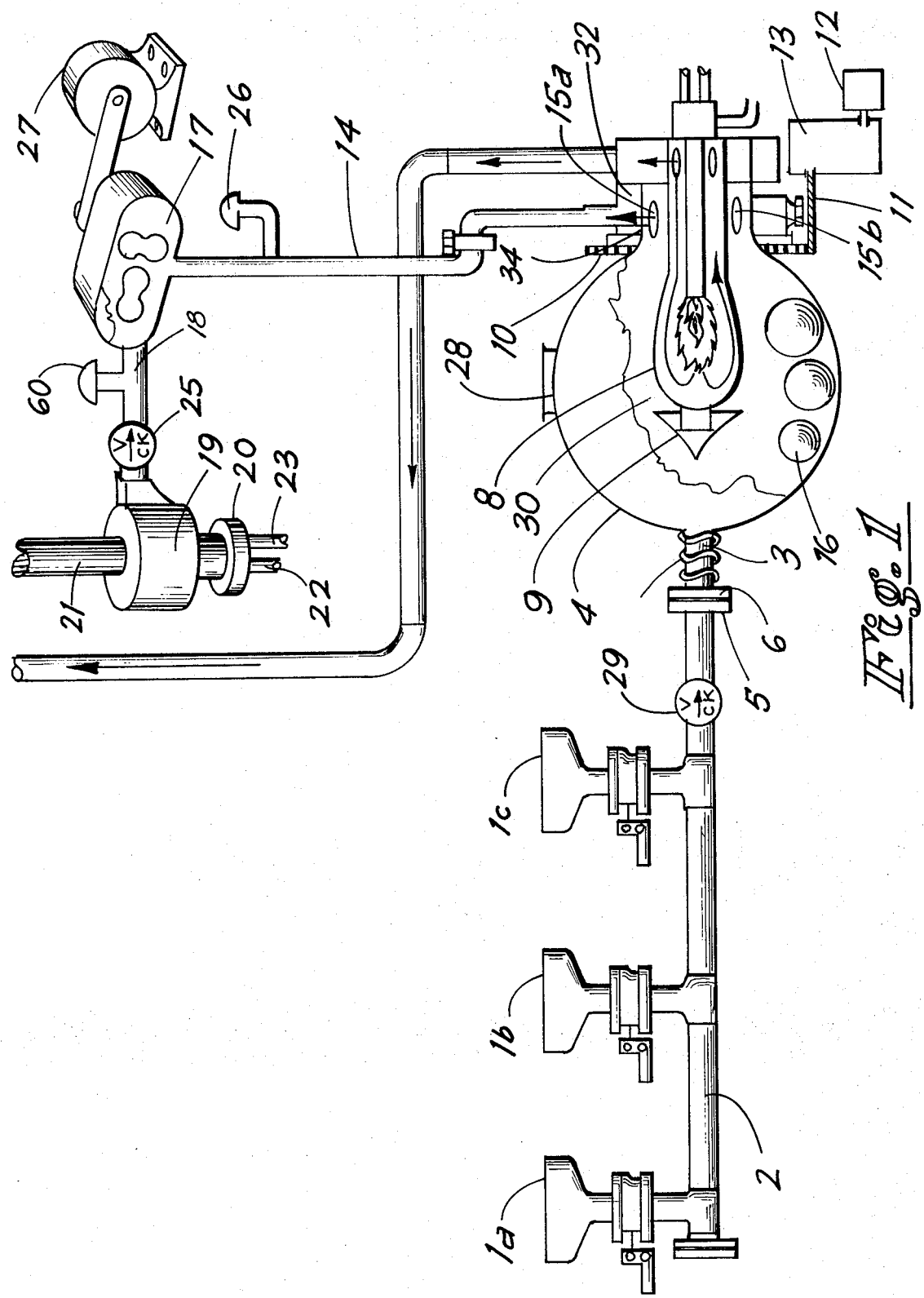
FIG. 1 is a perspective view, partially in section, of an apparatus of the present invention.

FIG. 1 of the drawing illustrates a structure of a disposal system for human waste of the present invention. The waste disposal system of the present invention includes a plurality of receptacles or stools 1a, 1b, and 1c, the stools being mounted in vertical position and in communication with an elongated horizontally extending conduit 2. The conduit 2 is in axial alignment with an elongated horizontally extending nose 3 of a rotatably mounted housing means or sphere 4, sphere 4 defining a plenum 30 therein for receiving waste from the receptacles 1a, 1b, and 1c. Nose 3 has an opening therein of generally the same diameter as the opening in conduit 2 for flow-through communication between conduit 2 and plenum 30. Nose 3 is in fluid tight communication with conduit 2 by means of sealing pressure plates 5 and 6, pressure plate 5 being stationary and attached to conduit 2 and pressure plate 6 being attached to nose 3 and adaptable for rotation thereon. A spring 7 is provided to encircle nose 3 and is spaced between pressure plate 6 and sphere 4 to maintain pressure on plate 6 when spere 4 is rotating thereby forming a fluid tight seal between the plates 5 and 6.

Disposed within shere 4 is a heat emitting means, such as a fuel gas heater 8. The fuel gas heater 8 is stationarily mounted within the sphere 4 and includes a deflector plate such as, for example, cone 9, in axial alignment with and spaced from the opening into the plenum 30 from nose 3. Rotatably mounted sphere 4 includes a driving gear 10, driving gear 10 being attached to the outer periphery of an elongated portion or neck 34 of the sphere 4. The driving gear 10 is in communication with gear means 11, gear means 11 being driven by motor 12 through a plurality of gears housed in gear housing 13.

Rotatably mounted sphere 4 is also in fluid tight communication with a stationary vertically extending elongated conduit 14 through stationary cylindrical collector 32 wherein apertures 15a and 15b in the elongated outwardly extending portion or neck 34 of sphere 4 are adapted to be in flow-through communication with conduit 14. Thus, vapors escaping during rotation of sphere 4 are removed by way of the stationary conduit 14.

Sphere 4 has disposed therein means for mashing and squeezing the waste matter from the receptacles 1a, 1b, and 1c and in the present example muller balls 16 of varying diameters are utilized for the mashing and squeezing of these materials. The mashing and squeezing of the solid waste material is accomplished by the rotation of the sphere 4 with the muller balls 16 of varying diameters rolling and tumbling about the bottom of the plenum 30 thereby squeezing and mashing the waste materials, freeing the liquid and vapors which are disposed therein. A gas heater 8 is also included to vaporize the liquids thereby enabling the concentration of the waste material to a waste consisting predominately of solid matter.

Coduit 14 is connected to a vacuum source as illustrated by vacuum pump 17 with a cyclonic particulate separator 35 disposed between collector 32 and vacuum pump 17 wherein a vacuum is pulled on sphere 4 removing all of the vapors from the plenum 30 therein. The particulate matter which may be entrapped in the vapor stream is removed by the particulate separator 35, particulate separator 35 having a clean out port 36 therein. On the downstream side of the vacuum pump 17 a conduit 18 is provided to transfer the vapors from the plenum 30 to an afterburner 19 wherein the vapors are brought in contact with elevated temperatures of the combustion products from the burner combustor 20, the results being a sterile odorless vapor which enters the atmosphere through line 21 from the afterburner 19. The burner combustor 20 is a fuel gas combustor fired by a fuel gas from line 22 in combination with combustion air from conduit 23 wherein the fuel gas and air enter the combustor 20 and are ignited by any known means, such as, for example, an electrode, a pilot gas burner, or the like. Conduit 18 includes a check value 25 disposed between the vacuum pump 17 and the afterburner 19 in order to prevent blow back from the afterburner 19 if the vacuum pump 17 fails or if the vacuum pump is reversed and the line 18 is on the suction side of the vacuum pump 17. Also provided in conduit 14 is a vacuum control valve 26 disposed between the plenum 30 and the vacuum pump 17, vacuum control valve 26 being used for maintaining a controlled vacuum on the plenum 30.

A reversible electric motor 27 is provided to drive the reversible vacuum pump 17. At predetermined times in the operation of the waste disposal system it is necessary to remove the solids from the plenum 30, the solids being the residue of the human waste in powder form after the liquids have been vaporized by the heater 8 and removed from the plenum 30 by the vacuum pump 17. When it is desired to remove the solids from the system, vacuum pump 17 is reversed and the plenum 30 is pressurized forcing the solids out of the plenum 30 through the opening 28 in sphere 4, opening 28 being closed during normal operations. The solids are collected in storage tanks or the like and then disposed of in any convenient manner.

When the vacuum pump 17 is reversed and the plenum 30 is pressurized, in order to prevent the blowing of the solid waste matter back into the conduit 2, a check valve 29 is provided in conduit 2 to close off the conduit when the plenum 30 is pressurized. Also, a vacuum breaker 60, open under negative pressure and closed under positive pressure, is provided in conduit 18, vacuum breaker 60 being disposed between check valve 25 and vacuum pump 17. Upon reversal of pump 17 and closing of check valve 25, vacuum breaker 60 opens to the atmosphere letting air into the system, but under normal operation when the plenum 30 is under a vacuum, vacuum breaker 60 is closed to the atmosphere.

Figure 2:
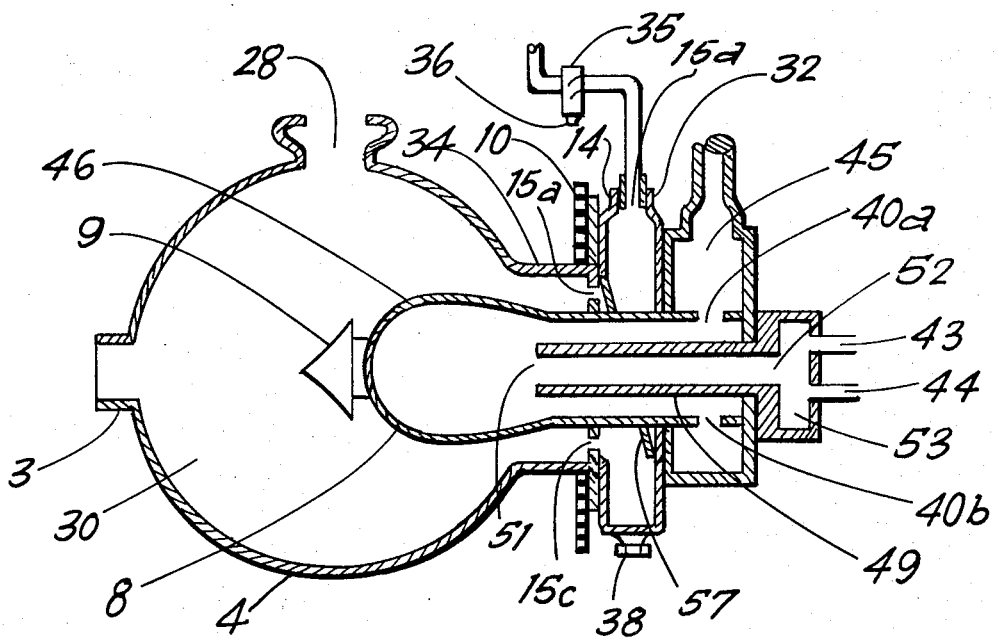
FIG. 2 is an enlarged cross-sectional view of a rotatable housing means in FIG. 1 including means for removing vapors from the rotatable housing means; and, FIG. 3 is an elevational view, partly in cross-section, of a receptacle of FIG. 1.

In FIG. 2 the stationary vacuum conduit line 14 is in fluid tight communication with the rotating sphere 4 through stationary cylindrical collector 32, the cylindrical collector 32 having an inside diameter of generally the same diameter as the outside diameter of the neck 34 of the rotating sphere 4. Collector 32 is adapted to fit fluid tight with the pressure plate 31 wherein as the sphere 4 rotates there will be a fluid tight seal between the collector 32 and the sphere 4. Collector 32 is further provided with a deflecting baffle 37 therein and a clean out port 38. Baffle 37 is disposed generally transverse of the collector 32 to deflect downward entrained powder in the gas stream leaving sphere 4 wherein the powder accumulates in the bottom of the collector 32. Clean out port 38 is provided to remove the accumulated powder buildup at predetermined periods of time.

FIG. 2 further shows the adaption of the gas fired furnace 8 to the sphere 4 wherein the gas fired furnace 8 is stationary and the sphere 4 rotates about the axis of the stationary gas fired burner 8. The gas fired burner 8 is provided with a combustion chamber 46 and a rear housing 45, the rear housing 45 being a receiver for the combustion gases from the combustion chamber 46. Disposed within the furnace 8 is an elongated burner tube 49, burner tube 49 being coaxially aligned with the furnace 8. Burner tube 49 is provided with an opening 51 at one end and an opening 52 at the opposite end, opening 51 opening into the combustion chamber 46 for discharging of the combustion products from the burner whereas opening 52 communicates with mixing chamber housing 53, chamber 53 being the mixing chamber for fuel gas and combustion air supplied through conduits 43 aNd 44, respectively.

Figure 3:
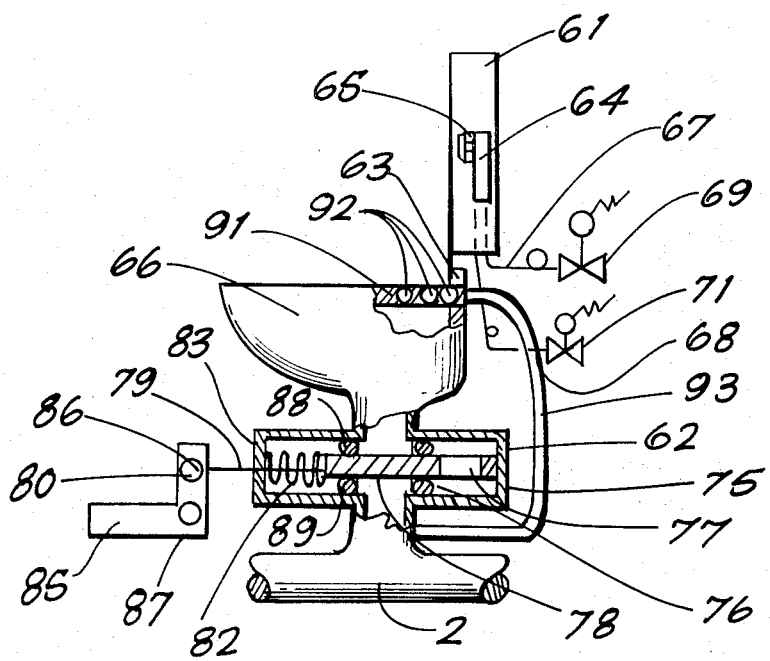

FIG. 3 shows one receptacle or stool 1 that may be used in the present invention for receiving waste material. Receptacle 1, being the receiver for human waste disposal, includes a bowl 66 and a valve assembly 62. A cover 61 is pivotally mounted to bowl 66 by means of hinges 63 and is further provided with an atomized water spray assembly for washing down the human waste disposal which is desposited in the bowl or stool 66. The air atomized water spray assembly includes a mixing chamber 64 for receiving air from line 67 and water from line 68, the air supplied to line 67 being regulated by solenoid operated valve 69 and the water supplied to line 68 being regulated by solenoid operated valve 71. The operation of these valves is dependent upon timing means (not shown) which opens and closes these valves at preselected time intervals. Further, the water and air supplied to the mixing chamber 64 is under pressure and is sprayed into the stool 66 by way of atomizing air-water spray nozzle 65.

Means for removing the human waste from the stools 66 is accomplished by the operation of a slidable valve assembly, such as a guillotine type valve assembly 62, in combination with a vacuum in conduit line 2. The valve assembly 62 includes a valve housing 75, valve housing 75 being adapted to receive the guillotine type valve 76 therein. The guillotine type valve 76 is provided with an aperture 77 therein in alignment with the bottom opening of stool 66. Valve 76 further includes impervious portion 78 for closing off the bottom of the stool 66 under normal conditions. Guillotine type valve 76 is also provided with an elongated extension 79 having hook means 80 at its extremity. Elongated extension 79 is adapted to receive resilient means 82 encircled therearound, the resilient means 82 being adapted to fit within the housing 75 adjacent the wall 83 and in communication with an edge of the impervious portion 78 of the guillotine-type valve 76. Hook means 80 of the valve 76 is adpated for mating with an L-shaped lever 85. L-shaped lever 85 is provided with apertures 86 and 87 therein, aperture 86 being at the extremity of one leg and adaptable for mating with the hook means 80, and aperture 87 being centered at the juncture of the legs for pivotally mounting the L-shaped lever 85 to a stationary support rod member (not shown) which is attached to a wall or a floor. O-rings 88 and 89 are provided as sealing means between the valve assembly 62 and stool 66, O-ring 88 forming a fluid tight seal between the bottom of the stool 66 and the valve assembly 62, and O-ring 89 forming a fluid tight seal between valve assembly 62 and the inlet to conduit 2.

In the operation of the valve assembly 62, pivoting downward of the horizontal leg of lever 85 forces valve 76 from its normally closed or nonflow-through position to a flow-through position by aligning the aperture 77 with the bottom opening (not shown) of the stool 66 and the inlet to the conduit 2. As soon as the lever 85 is released the resilient spring means 82 being biased between the stationary wall 83 and the slidably mounted valve 76 forces the valve 76 away from the flow-through position back to its normally closed position.

Bowl 66 is provided with a duct 91 extending around the inner periphery of the top section of the bowl 66. Duct 91 is provided with inwardly extending openings 92 therein and is in flow-through communication with one end of an elongated tubular member 93, member 93 being in flow-through communication with conduit 2 at its opposite end. The inclusion of duct 91 with apertures 92 therein, duct 91 being in communication with the vacuum system through tubular member 93, establishes a ventilation system at each receptacle thereby substantially eliminating odors in a confined area.

In operation of the human waste disposal system of the present invention, human waste is collected in one of the receptacles 1a, 1b, or 1c and at predetermined times the receptacles are discharged into conduit 2. Discharging or flushing is accomplished by energizing the solenoids on the solenoid operated valves 69 and 71, valves 69 and 71 regulating flow of air and water from the water supply. A predetermined time elapses and normally closed valve assembly 62 may then be opened by pivoting the horizontal leg of the L-shaped lever 85 in a downward direction. Lever 85 is held in its downward position until all of the waste is discharged by gravity in combination with a vacuum into conduit 2. It is realized that the operation of L-shaped lever 85 opening valve 62 to discharge material from the stool 66 into conduit 2 may be operated simultaneously with the operation of solenoid operated valves 69 and 71 as well as at a predetermined time after the operation of valves 69 and 71. Conduit 2, being under vacuum from the operation of vacuum pump 17, transfers the waste into the rotating sphere 4. Sphere 4 rotates at generally about 5 or 6 revolutions per minute maintaining the waste in a semi-liquid state in plenum 30 by mashing and squeezing the waste material with the muller balls 16.

Deflector plate 9 being provided at the end of the gas fired furnace 8 is in alignment with the conduit 2 so that as the waste materials enter the plenum 30 from the conduit 2 the deflector plate 9 deflects the material toward the inside walls of the plenum 30 preventing a buildup on the furnace 8. The temperature within the plenum 30 is maintained at generally between 220° − 250° F. by gas fired furnace 8 as this has been found to be a temperature which will vaporize most of the liquids in the human waste material. The vapors evolving from the mulling and heating of the waste materials are then vacuumed out of the plenum 30 through openings 15 in the neck 34 of the sphere 4 and into the conduit 14 on he upstream side of the vacuum pump 17. Vapors from the conduit 14 are then transferred to the afterburner 19 and mixed with the combustion products from the burner combustor 20. The products of combustion and vapors leaving the afterburner 19 are maintained in excess of 1,200° F. as it has been found that at this temperature the resulting gases that are allowed to escape into the atmosphere from conduit 21 are sterile and bacteria free.

After a sufficient time of operation, a solids buildup results in plenum 30. Cover for opening 28 of sphere 4 is removed and the vacuum pump 17, being a reversible pump, is reversed by the electric motor 27 wherein the powders or solids in plenum 30 are removed under air pressure developed by pump 17. The powders may be caught in a tank, drum or any other means for storage and/or disposal.

It will be realized that various changes may be made to the specific embodiment as shown and described without departing from the principles and scope of the present invention.

What is claimed is:

1. A disposal system for human waste comprising:
   a. at least one receptacle for collecting waste products;
   b. a rotatable housing means;
   c. a first conduit means connecting said receptacle in flow-through communication with said rotatable housing means;
   d. said housing means defining a plenum therein including a heat emitting means and grinding means, said housing means being connected to rotating means;
   e. a vacuum source;
   f. a second conduit means connecting said housing means in flow-through communication with said vacuum source; and,
   g. an afterburner in communication with said vacuum source whereby vapors from said plenum are subjected to combustion.

2. The disposal system for human waste of claim 1 wherein said housing means includes an inlet for receiving human waste therein and a first and second outlet, said first outlet being for vapors, said second outlet being for solids removal.

3. The disposal system for human waste of claim 1 wherein the heat emitting means includes a deflector plate in axial alignment with said first conduit whereby human waste entering said plenum are deflected to the inside walls of said plenum.

4. The disposal system for human waste of claim 1 wherein said heat emitting means is a fuel gas combustor disposed within said rotatable housing means, said fuel gas combustor including an elongated portion extending through an opening in said housing means, said opening of said housing means being in fluid tight communication with the outer periphery of said elongated portion of said fuel gas combustor.

5. The disposal system for human waste of claim 1 wherein said grinding means is a plurality of muller balls of varying diameters.

6. The disposal system for human waste in claim 1, said heat emitting means being stationarily mounted.

7. The disposal system for human waste of claim 1 wherein said vacuum source is a reversible pump whereby air pressure may be introduced into said plenum for removing solid materals from said plenum.

8. The disposal system for human waste of claim 1, said receptacle for collecting human waste including an air-atomized water spray.

9. The disposal system for human waste of claim 1 including a ventilating duct disposed around the inner periphery of said receptacle for collecting waste products, said ventilating duct being in communication with said first conduit means.

10. The disposal system for human waste of claim 1 wherein said receptacle for collecting human waste is a stool including valve means, said valve means being in a normally closed position.

11. The disposal system for human waste of claim 10 wherein said valve means includes an L-shaped lever in communication with a slidable valve assembly, said valve assembly being operated by said L-shaped lever in one position and a resilient spring means in a second position, said resilient spring means being disposed between said L-shaped lever and a slidable valve within said valve assembly.

* * * * *